July 3, 1928.  F. J. LAIRD  1,675,979
VALVE
Original Filed Dec. 11, 1925
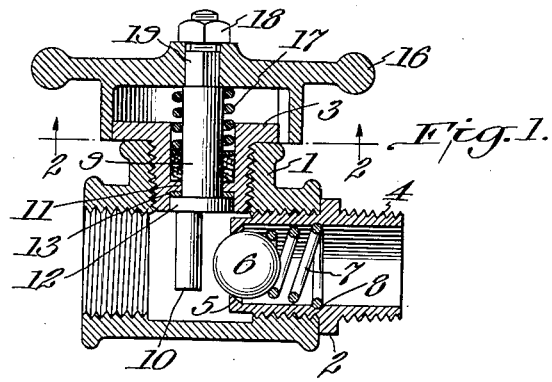
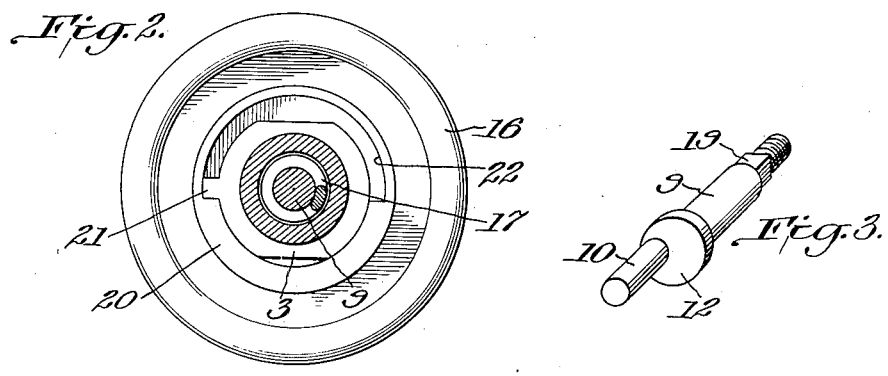
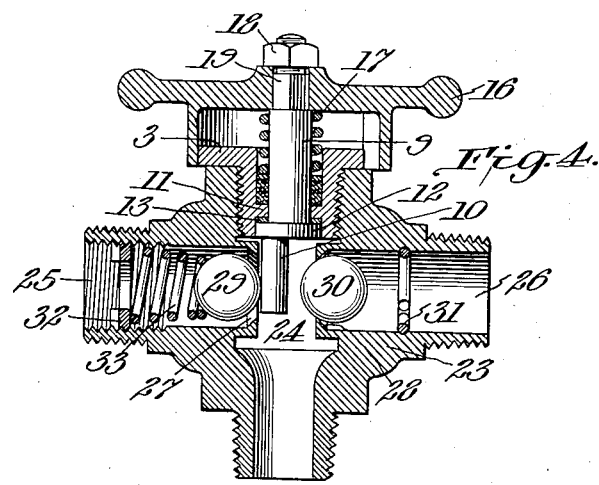
Inventor:
Frank J. Laird,
By Byrnes, Townsend & Brickenstein,
Attorneys.

Patented July 3, 1928.

1,675,979

UNITED STATES PATENT OFFICE.

FRANK J. LAIRD, OF BUTTE, MONTANA.

VALVE.

Original application filed December 11, 1925, Serial No. 74,858. Divided and this application filed December 1, 1926. Serial No. 151,966.

This application is a division of my copending application Serial No. 74,858, filed December 11, 1925.

This invention relates to valves and particularly to valves of the type in which the valve is seated by the pressure of the incoming fluid and is mechanically forced from its seat to open the same. An object of the invention is to provide an improved valve having a minimum number of moving parts, which parts are so constructed that a fresh surface of the valve engages the seat at each valve-closing operation. An object is to provide a valve in which a ball valve member is retained against accidental separation from the body of the valve. A further object of the invention is to provide a novel ball valve construction which may be embodied in various types of valves. More specifically, objects of the invention are to provide a bushing having a valve and valve seat therein and a second bushing carrying a valve-actuating shaft, which bushings may be combined with a standard pipe fitting to form a valve.

These and other objects of my invention will be apparent from the following specification when taken in connection with the accompanying drawings illustrating certain embodiments of my invention, in which drawings Fig. 1 is a central section through a single valve;

Fig. 2 is a horizontal section on line 2—2 of Fig. 1;

Fig. 3 is a perspective view of a valve operating shaft; and

Fig. 4 is a central section through a double, but alternatively opening, valve.

In the drawings, the numeral 1 indicates the body or casing of the valve which may be a standard pipe fitting having a valve-carrying bushing 2 and a stem-carrying bushing 3 threaded into two of the intersecting passages of the fitting. The outer end 4 of the valve-carrying bushing is provided with standard pipe threads and the inner end terminates in a valve seat 5. A ball valve 6 is located within the bushing 2 and is retained therein and urged toward the seat 5 by a spring 7 which has its outer coil seated in a transverse recess 8 in the inner wall of the bushing.

The valve-actuating mechanism carried by the bushing 3 comprises a shaft 9 rotatably mounted therein and carrying an eccentrically arranged member or rod 10. The stem-receiving passage through the bushing 3 is preferably counterbored at both ends to provide openings for packing material. Between these counterbored portions is the projecting ring 11 in which the shaft 9 is journaled. The inner end of the shaft is provided with an enlarged head 12 which is received within the inner counterbore, a packing washer 13 being positioned between the adjacent radial faces of the journal 11 and the head 13. The outer counterbored portion of the bushing 13 receives packing material 14 and a metallic washer 15. The outer end of the shaft 9 is provided with an operating handle or wheel 16 which is fixed thereto in any suitable manner, and a spring 17 is provided between the handle 16 and the metallic washer 15. The handle or wheel 16 may be secured to the threaded end of the stem 9 by a nut 18, the handle and stem being provided with cooperating portions 19 of square or other non-circular cross-section.

The handle or wheel 16 is preferably provided with a depending flange or skirt 20 which encloses the outer end of the bushing 3. If desired, the bushing 3 and handle 16 may have cooperating lugs or flanges for limiting the turning movement of the stem 9. As shown in Fig. 2, these stop elements may take the form of a laterally projecting lug 21 on the bushing and an arcuate recess 22 on the inner wall of the flange 20. The end walls of the recess 22 will alternately engage the opposite sides of the lug 21 to limit the angular movement of the stem 9.

As shown in Fig. 4, the invention is embodied in a valve adapted to connect any one of a number of pressure lines with an outlet line. The valve casing 23 is provided with an outflow chamber 24 at which the inlet passages 25, 26 terminate in the valve seats 27, 28, respectively. Ball valves 29, 30 are located in the inlet passages for cooperation with the valve seats 27, 28, respectively, and the inlet passage 26 is provided with a spring ring 31 for preventing the loss of the ball valve 30 from the valve casing. As the valves are normally held against their seats by the fluid pressure of the inlet line, it is necessary that means be provided for preventing the inadvertent opening of the valve in a low pressure line when the valve of a high pressure line has been mechanically opened to establish a high fluid pressure in the outflow chamber 24. As illustrated, the inlet passage 25 is adapted to be connected to the low pressure line and the inner wall of the passage is provided with screw threads for receiving the threaded follower 32 which holds the spring 33 in engagement with the ball valve 29. By adjusting the compression of the spring 33 the valve 29 will be retained against its seat, even though the valve 30 is open to establish a high pressure in the outflow chamber. The valve-operating mechanism comprises an operating shaft and handle which may be carried by a removable bushing. As illustrated, the several parts are identical with corresponding elements of the single valve embodiment and are identified by the same reference numerals. As the stem carries but one eccentric rod 10, only one of the supply lines may be opened to the outflow chamber at any time.

It will be noted that the valve casing may be formed as a single casting in which the valve seats are cut (as shown in Fig. 4), or the casing may be provided with a plurality of intersecting passages in which valve and valve-operating devices are introduced by means of bushings which also provide means for connecting the valve to the pipe lines (Fig. 1).

Unless the valves are to be used in lines subject to such low pressure that the weight of the valve may prevent it from seating, it is unnecessary to provide a spring for forcing the valve toward its seat. The valve will of course be constructed of materials which are best adapted for the particular fluids to be handled. As the ball valves are moved from their seats by a substantially tangential pressure, the balls are rotated at each unseating movement and a fresh surface comes into engagement with the valve seat when the valve closes.

It is to be understood that the invention is not limited to the specific embodiments herein shown and described, since various changes which may be made in the several parts, their relative size, shape and location fall within the scope of my invention as set forth in the following claims.

I claim:

1. In a valve, the combination with a casing having a valve seat and a ball valve for cooperation with said seat, of a shaft having an enlarged inner head, a valve actuating crank arm projecting from said enlarged head, a counterbored passage in said casing for rotatably supporting said shaft, packing between the transverse wall of said passage and head, packing material in the outer counterbore of said passage, operating means secured to said shaft, and yielding means between said operating means and said packing material for compressing the latter.

2. In a valve, the combination with a casing having intersecting passages therein, a valve seat and a valve member located in one passage, of a bushing located in the passage intersecting the valve-receiving passage, a counterbored passage through said bushing, a packing ring at the inner transverse wall of said passage, packing material at the outer transverse wall of said passage, a shaft having an enlarged portion seated in said inner counterbore and engaging said packing ring, means secured to said shaft for rotating the same, spring means between said rotating means and said packing material, and means carried by said shaft for operating said valve member.

3. A device for use in converting a standard pipe fitting into a manually operated valve, said device comprising a bushing having the ends thereof provided with standard pipe threads, a passage through said bushing, the wall of said passage being contracted to provide a valve seat at one end thereof, a ball in said passage for cooperation with said seat, and means retaining said ball in said passage.

4. A device for use in converting a standard pipe fitting into a valve, said device comprising a bushing provided externally with standard pipe threads, a passage extending through said bushing and counterbored at both ends thereof to define an internal rib, a shaft journaled in said rib and having an enlarged head positioned in the inner counterbore, a valve-operating member projecting from said head and eccentrically of said shaft, an operating handle for said shaft, packing material in the outer counterbore, and a spring between said handle and packing material.

5. A valve comprising a standard T pipe fitting, a bushing threaded into one opening of said fitting, a valve seat in said bushing, a ball valve on the inlet side of said seat, a second bushing threaded into the vertical opening of said T fitting, a passage through said second bushing, and a shaft journaled in said passage and having an eccentrically arranged operating member for said ball valve.

6. The structure as in claim 5 wherein the passage through said second bushing is counterbored, and said shaft has an enlarged inner head which carries the valve operating member.

7. The structure as in claim 5 wherein the passage through said second bushing is counterbored from both ends, said shaft has an enlarged inner head which carries the valve operating member, and packing means at the base of both the counterbores of said passage.

In testimony whereof, I affix my signature.

FRANK J. LAIRD.